(12) United States Patent
Anderson et al.

(10) Patent No.: US 8,769,249 B2
(45) Date of Patent: Jul. 1, 2014

(54) INSTRUCTIONS WITH FLOATING POINT CONTROL OVERRIDE

(71) Applicant: Intel Corporation, Santa Clara, CA (US)

(72) Inventors: Cristina S. Anderson, Hillsboro, OR (US); Simon Rubanovich, Haifa (IL); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/670,326

(22) Filed: Nov. 6, 2012

(65) Prior Publication Data

US 2013/0067204 A1   Mar. 14, 2013

Related U.S. Application Data (63) Continuation of application No. 11/967,145, filed on Dec. 29, 2007, now Pat. No. 8,327,120.

(51) Int. Cl.
*G06F 7/38* (2006.01)

(52) U.S. Cl.
USPC .......................................... 712/222; 712/229

(58) Field of Classification Search
None
See application file for complete search history.

(56) References Cited

U.S. PATENT DOCUMENTS

| | | | |
|---|---|---|---|
| 4,903,264 A | 2/1990 | Talgam et al. | |
| 5,634,118 A | 5/1997 | Blomgren | |
| 5,696,709 A | 12/1997 | Smith, Sr. | |
| 5,822,556 A | 10/1998 | Potter et al. | |
| 6,014,739 A | 1/2000 | Christie | |
| 6,058,410 A | 5/2000 | Sharangpani | |
| 6,219,684 B1 | 4/2001 | Saxena et al. | |
| 6,247,116 B1 | 6/2001 | Abdallah et al. | |
| 6,266,686 B1 | 7/2001 | Bistry et al. | |
| 6,282,554 B1 | 8/2001 | Abdallah et al. | |
| 6,317,824 B1 | 11/2001 | Thakkar et al. | |
| 6,321,327 B1 | 11/2001 | Makineni et al. | |
| 6,493,817 B1 | 12/2002 | Renstrom | |
| 6,529,922 B1 | 3/2003 | Hoge | |
| 6,571,265 B1 | 5/2003 | Story | |
| 6,601,079 B1 | 7/2003 | Phillips | |
| 6,748,516 B2 | 6/2004 | Ganapathy et al. | |
| 6,779,013 B2 | 8/2004 | Pangal | |
| 6,879,992 B2 | 4/2005 | Zohar | |
| 6,889,242 B1 | 5/2005 | Sijstermans et al. | |
| 7,149,878 B1 | 12/2006 | Jensen et al. | |

(Continued)

OTHER PUBLICATIONS

Intel (Intel 64 and IA-32 Architectures Software Developer's Manual—vol. 1: Basic Architecture); Nov. 2006, pp. 2-2, 2-15, 4-29, 4-30, 5-11, 5-12, 5-23 (7 total pages).

(Continued)

*Primary Examiner* — Keith Vicary
(74) *Attorney, Agent, or Firm* — Blakely, Sokoloff, Taylor & Zafman LLP (57) ABSTRACT

Methods and apparatus relating to instructions with floating point control override are described. In an embodiment, a processor includes a first logic to receive an instruction having one or more bits corresponding to override control data. The override control data is to indicate one or more floating point operation settings that are to override one or more default settings. The processor also has a second logic to perform a floating point operation in response to the instruction and at least one of the one or more floating point operation settings.

14 Claims, 5 Drawing Sheets

(56) References Cited

U.S. PATENT DOCUMENTS

| | | |
|---|---|---|
| 7,216,138 B2 | 5/2007 | Abdallah et al. |
| 7,272,623 B2 | 9/2007 | Cornea-Hasegan |
| 7,380,240 B2 | 5/2008 | Zhang et al. |
| 2002/0194240 A1 | 12/2002 | Pangal et al. |
| 2006/0075218 A1 | 4/2006 | Barragy et al. |
| 2007/0074008 A1 | 3/2007 | Donofrio |
| 2008/0077779 A1 | 3/2008 | Zohar et al. |
| 2009/0210678 A1 | 8/2009 | Ford |

OTHER PUBLICATIONS

IEEE (Draft Standard for Floating Point Arithmetic P754) Draft 1.4.0: Apr. 13, 2007; 60 pages.

Intel (Intel 64 and IA-32 Architectures Software Developer's Manual—vol. 1: Basic Architecture); Nov. 2006, pp. 11-26 and 11-27.

Intel (Intel 64 and IA-32 Architectures Software Developer's Manual—vol. 1: Basic Architecture); Nov. 2006, pp. 10-5 to 1-8.

ISSCC95 (Large-Scale Integration versus Multi-Chip Modules): ISSCC95 Evening Discussion Session /TE6; 1995 IEEE International Solid State Circuits Conference; 2/16/199; 2 pages.

INSTRUCTIONS WITH FLOATING POINT CONTROL OVERRIDE

The present application is a continuation of U.S. patent application Ser. No. 11/967,145, filed on Dec. 29, 2007, entitled "INSTRUCTIONS WITH FLOATING POINT CONTROL OVERRIDE", now U.S. Pat. No. 8,327,120. U.S. patent application Ser. No. 11/967,145 is hereby incorporated herein by reference.

FIELD

The present disclosure generally relates to the field of electronics. More particularly, an embodiment of the invention relates to instructions with floating point control override.

BACKGROUND

Some processors may perform floating point (FP) operations. Results of such operations may be rounded in accordance with a default rounding setting. The default rounding setting may need to be modified due to various conditions applicable for a given floating point operation. The modification of the default rounding setting may be performed by read and store operations in a processor. In some situations, current state data of a processor may need to be saved prior to modification of the default rounding setting and later restored after completion of the given floating point operation. Accordingly, modification to default rounding settings in processor may cause latency, additional power consumption, etc.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, the use of "instruction" or "micro-operation" (which may also be referred to as "uop") herein may be interchangeable.

Some of the embodiments discussed herein may be utilized to override settings indicated by a floating point control register on a per instruction basis. For example, an instruction may include override control data that is used to process data instead of, or in combination with default setting(s) provided by, a floating point control register (such as a multimedia extension control status register (MXCSR) in accordance with at least one instruction set architecture). In an embodiment, bypassing access or modification of the floating point control register may provide additional efficiency (e.g., lower latency) for short, performance-critical operation(s) (such as correct floating point divide, for example). Further, the described techniques may be used for any type of floating point instructions, including FMA (Floating point-Multiply-Accumulate), add, multiply, divide, square root, floating point compare, floating point format conversion (e.g., double to single precision, or integer to single precision), etc. Such techniques may allow for improved performance in various processors, such as those discussed herein, e.g., with reference to FIGS. 1-5.

Figure 1:
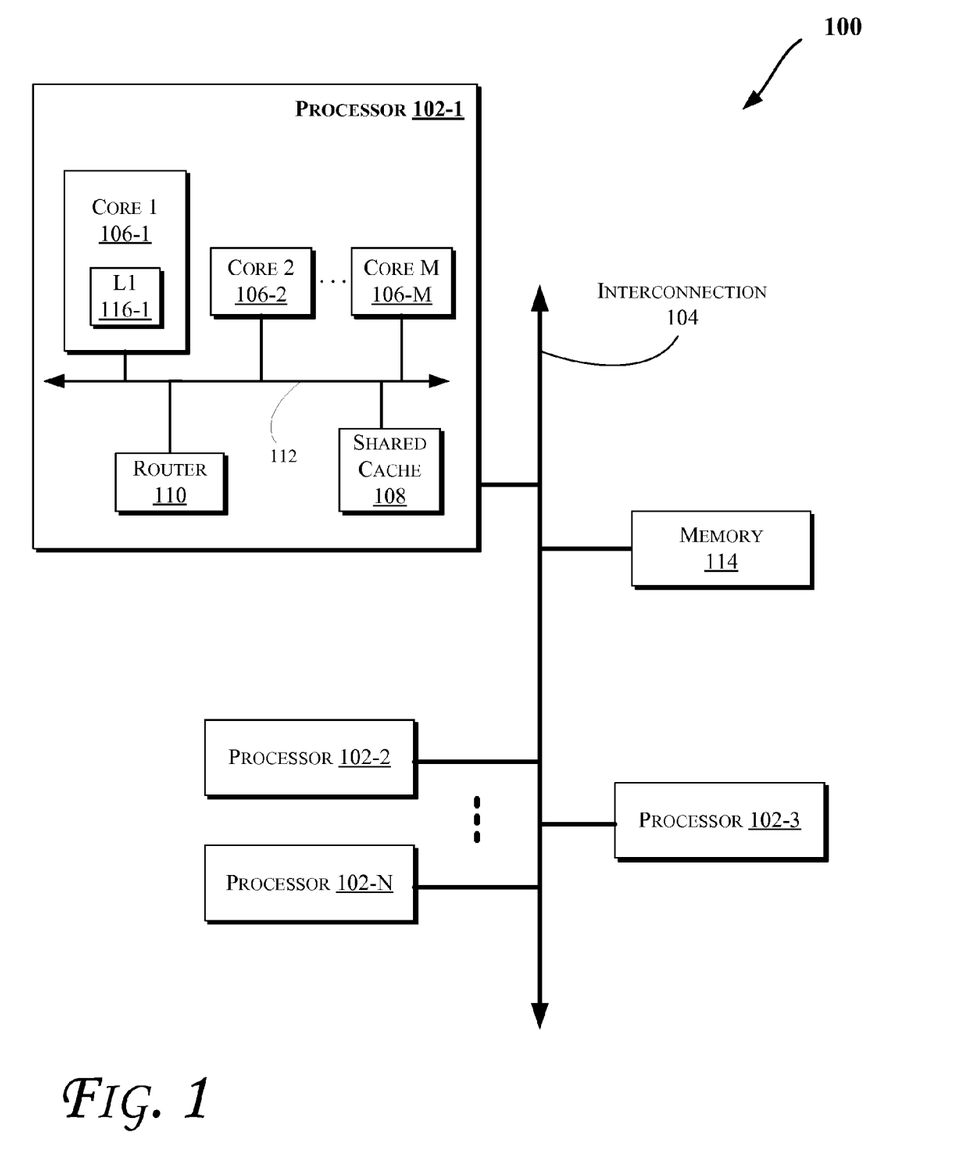
FIGS. 1, 4, and 5 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 4 and 5), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116").

Figure 2:
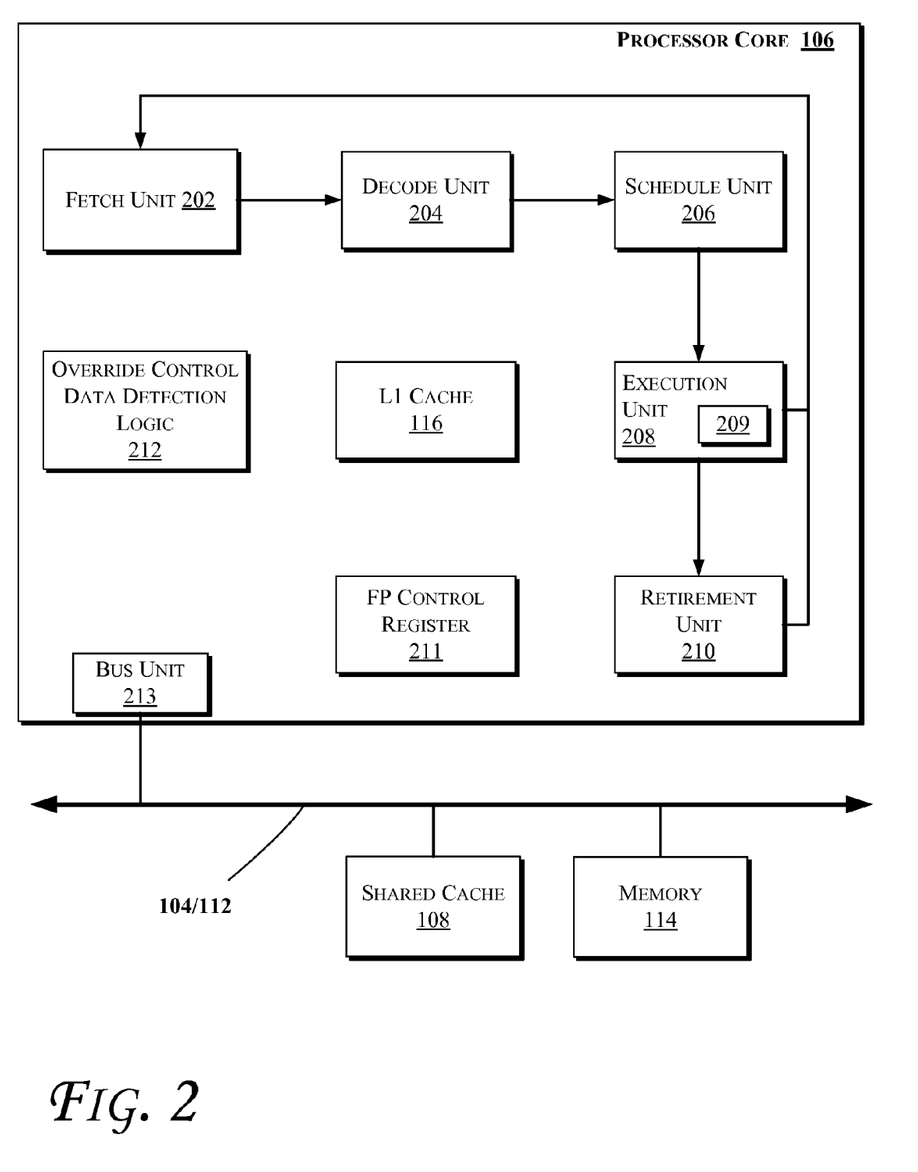
FIG. 2 illustrates a block diagram of portions of a processor core and other components of a computing system, according to an embodiment of the invention.

FIG. 2 illustrates a block diagram of portions of a processor core 106 and other components of a computing system, according to an embodiment of the invention. In one embodiment, the arrows shown in FIG. 2 illustrate the flow direction of instructions and/or data through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 4 and 5. The core 106 may optionally include a decode unit 204 to decode the fetched instruction. In an embodiment, the decode unit 204 may decode the fetched instruction into a plurality of uops (micro-operations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as one or more memory execution units, one or more integer execution units, one or more floating-point execution units (209), or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

The core 106 may additionally include a floating point (FP) control register 211 which may store one or more settings relating to floating point operations that are performed by the floating point unit 209, for example. The settings stored in the register 211 may be referred to herein as default settings. Also, in an embodiment, the register 211 may be a control and status register (named MXCSR in an embodiment). As will be further discussed herein, e.g., with reference to FIG. 3, the core 106 may include an override control data detection logic 212. The logic 212 may detect whether a received instruction includes override control data that is to override and/or cause modification to settings stored within the register 211 (e.g., when the rounding mode for the instruction is determined as a function of both settings in register 211 and control data provided in the instruction itself). In some embodiments, the logic 212 may be provided in other locations than that shown in FIG. 2 (e.g., within any of the units 202-209, etc.). Additionally, the core 106 may include a bus unit 213 to allow communication between components of the processor core 106 and other components (such as the components discussed with reference to FIG. 1) via one or more buses (e.g., buses 104 and/or 112).

Figure 3:
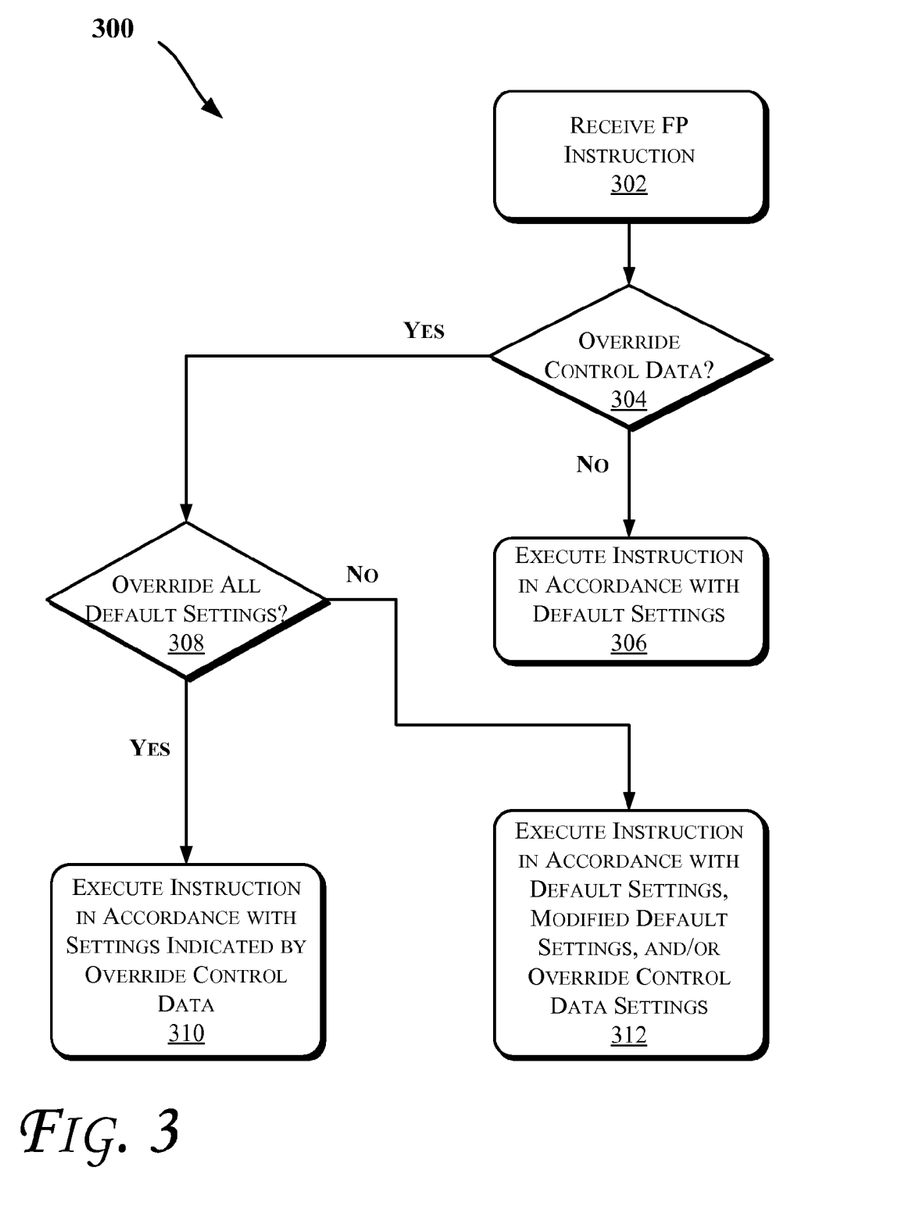
FIG. 3 illustrates a flow diagram of a method in accordance with an embodiment of the invention.

FIG. 3 illustrates a flow diagram of a method 300 to determine whether to override default floating point operation settings, according to an embodiment of the invention. In some embodiments, various components discussed with reference to FIGS. 1-2 and 4-5 may be utilized to perform one or more of the operations discussed with reference to FIG. 3.

Referring to FIGS. 1-3, at an operation 302, a floating point instruction may be received. For example, the fetch unit 202 may fetch the instruction from a memory such as discussed with reference to FIG. 2. At an operation 304, it may be determined (e.g., by logic 212) whether the received instruction includes override control data. The override control data may indicate one or more floating point operation settings that are to override and/or modify one or more default settings (such as those stored in register 211). In an embodiment, the override control data may be provided in the operand of the instruction. If no override control data is present, the instruction may be executed at operation 306 (e.g., by the FP unit 209) in accordance with default settings (such as those stored in register 211). Otherwise, at an operation 308, it may be determined whether all default settings are to be overridden (e.g., by override control data detection logic 212 and/or FP unit 209). If so, at an operation 310, the instruction may be executed (e.g., by the FP unit 209) in accordance with settings provided by the override control data. Otherwise, at an operation 312, the instruction may be executed (e.g., by the FP unit 209) in accordance with any combination of default settings, settings provided by the override control data, and/or default settings as modified based on an indication by override control data.

In some embodiments, the override control data may include one or more of the following fields:

(a) Rounding mode bits (e.g., with one or more bits such as 3 bits in an embodiment)—At least one of the 8 encodings may direct the hardware (e.g., the FP unit 209) to use the default rounding mode settings (e.g., from MXCSR) for the result of the instruction. The remaining encodings may be used for the four mandated IEEE rounding modes (such set forth in the Institute of Electrical and Electronics Engineers (IEEE) standard 754-1985 (published 1985)), as well as optional rounding modes (e.g., round-to-nearest-ties-away such as set forth in IEEE 754R (e.g., in accordance with draft 1.4.5 (Jul. 13, 2007) for revised IEEE 754 standard).

(b) Exception-disable (ED) (e.g., with one bit)—If set, the ED bit may prevent the reporting of any floating-point exceptions: No exceptions are raised even if unmasked in the floating point control register (e.g., MXCSR). No status flags are set in the floating point control register (e.g., MXCSR). If the ED bit is not set the instruction uses default exception behavior (as specified in MXCSR). Of course, depending on the implementation setting versus clearing of this bit may be reversed.

(c) Flush-to-zero (FTZ) (e.g., with one bit)—FTZ may indicate whether denormals may be converted to zero after rounding. When set, the override control FTZ bit overrides the corresponding FTZ bit in the floating point control register (e.g., MXCSR). When the override control FTZ bit is 0, the FTZ behavior is defined by the floating point control register (e.g., MXCSR). Of course, depending on the implementation setting versus clearing of this bit may be reversed.

(d) Denormal-as-zero (DAZ) (e.g., with one bit)—DAZ may indicate whether denormals may be converted to zero before rounding. When set, the override control DAZ bit overrides the corresponding DAZ bit of the floating point control register (e.g., MXCSR). When the override control DAZ bit is 0, the DAZ behavior is defined by the floating point control register (e.g., MXCSR). Of course, depending on the implementation setting versus clearing of this bit may be reversed.

(e) Precision control field (e.g., with one or more bits)—This field may force rounding of the mantissa to a lower precision format, e.g., fewer bits. This may help reduce or avoid double rounding in some situations.

(f) Exponent width control field (e.g., with one or more bits)—This field may be used for situations where a wider or different exponent is used for intermediate computations.

In an embodiment, the rounding mode bits (e.g., included in the routing control field of the override control data) may include three bits, where 000 is for RN (Round to Nearest), 001 is for RD (Round Up), 010 is for RU (Round Up), 011 is for RZ (Round to Zero), 100 is for using MXCSR's RC (round control) field (e.g., for one of RN, RD, RU, RZ as set in the control register RC field), and where 101, 110, 111 may be used for other optional rounding modes. In an embodiment, since the rounding control field has room for additional rounding modes (e.g., for 101, 110, or 111), some of these modes may be defined as a function of the rounding mode defined by the floating point control register (e.g., defined by the MXCSR in an embodiment). For example one mode could negate the rounding direction defined in the floating point control register. Such an embodiment may provide additional control for the accuracy of the result and may also help reduce (or eliminate) the need for other hardware utilization (e.g., instructions that implement the negation of an arithmetic operation).

In accordance with one embodiment, the pseudo code illustrated below may be used to compute a/b correctly rounded, as specified in MXCSR rounding control field (a, b are such that a/b does not overflow/underflow), wherein MOVAPS indicates a load (destination on the left, source on the right), RCPPS indicates a starting reciprocal approximation (the result is a rough approximation of 1/operand), FNMARndPS indicates negative-multiply and accumulation (i.e. result=src1−src2*src3), FMARndPS indicates multiply-accumulate (result=src1+src2*src3).

```
MOVAPS xmm0, a
MOVAPS xmm1, b
MOVAPS xmm3, 1.0
MOVAPS xmm4, 0.0
RCPPS xmm2, xmm1          ;;;; y_0 ~ 1/b
FNMARndPS xmm3, xmm3, xmm2, xmm1, 8
      ;;;; e_0 =1 − b*y0 (RN mode, ED on)
FMARndPS xmm4, xmm4, xmm0, xmm1, 8
      ;;;; q_0 = a*y_0 (RN mode, ED on)
FMARndPS xmm2, xmm2, xmm2, xmm3, 8
      ;;;; y_1 = y_0+y_0*e0 (RN mode, ED on)
;;;; all intermediate steps may use FMA with immediate=8 (RN mode,
ED on). Not all intermediate steps (iterations) are shown here. The
number of iterations needed to produce a correct result may be
determined by the accuracy of the starting approximation (RCPPS).
;;;; number of computation steps depends on accuracy of RCPPS
      FNMARndPS xmm5, xmm0, xmm1, xmm4, 8
            ;;;; R = a − b*q_k (RN mode, ED on)
      FMARndPS xmm0, xmm4, xmm5, xmm2, 4
            ;;;; Result = q_k+R*y_k = (a/b)rnd_MXCSR_mode
            ;;;; final FMA executed with ED off, MXCSR rounding
            mode
```

In some embodiments, while instructions with control override may be used in both scalar form and vector form, the vector forms may especially help improve SIMD (Single Instruction, Multiple Data) performance by minimizing the number of branches, since undesirable behavior may be easily suppressed via override controls. Examples of undesirable behavior that would require branching or explicitly setting MXCSR are unwanted exceptions and slow treatment of gradual underflow and denormals (e.g., where less accurate treatment is sufficient). It may be used to improve worst-case performance of vectorized code by helping minimize branches while maintaining correctness of results. Accordingly, some embodiments allow full rounding control at instruction level and leave room for supporting additional rounding modes. This makes it easy to add hardware support for additional rounding modes such as the IEEE 754R RN-ties-away mode, without changing the MXCSR format (which may introduce backward compatibility issues).

Figure 4:
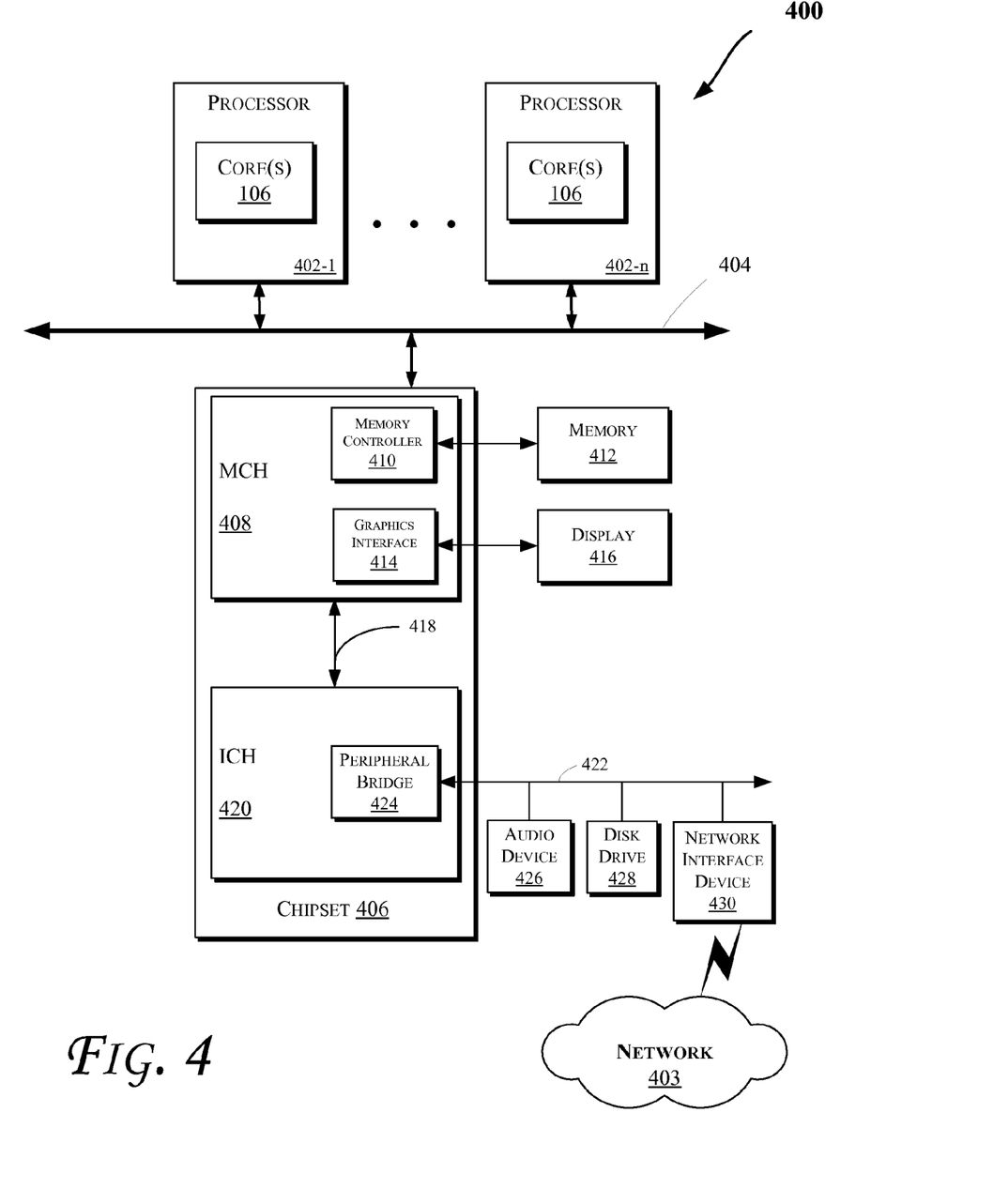

FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. For example, one or more of the processors 402 may include one or more of the cores 106. Also, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display device 416. In one embodiment of the invention, the graphics interface 414 may communicate with the display device 416 via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 in some embodiments of the invention. In addition, the processor 402 and other components shown in FIG. 4 (including but not limited to the MCH 408, one or more components of the MCH 408, etc.) may be combined to form a single chip. Furthermore, a graphics accelerator may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
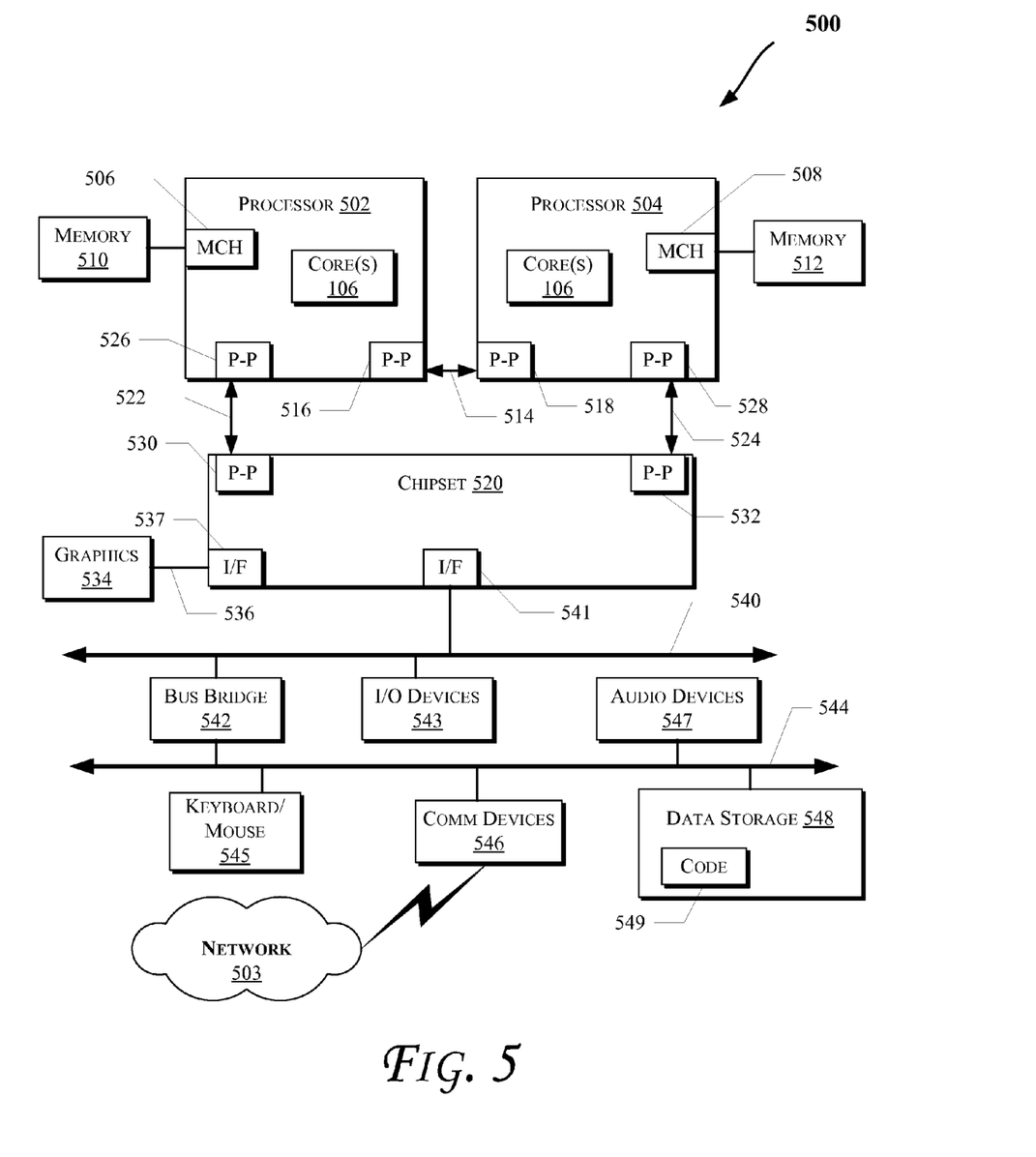

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment of the invention may be provided within the processors 502 and 504. For example, one or more of the cores 106 of FIGS. 1-4 may be located within the processors 502 and 504. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 503), audio I/O device 547, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor comprising:
a first logic to receive an instruction having one or more bits of override control data, wherein the override control data is to indicate one or more floating point operation settings that are to override one or more default settings; and
a second logic including hardware to perform a floating point operation in response to the instruction and at least one of the one or more floating point operation settings, wherein the one or more bits comprise an exception disable bit to prevent modification of status in a control register of the processor in response to different types of exceptions.

2. The processor of claim 1, wherein at least one of the one or more floating point operation settings is to cause a modification to one of the one or more default settings during execution of the instruction, wherein the second logic is to perform the floating point operation, at least in part, based on the modified default setting.

3. The processor of claim 1, wherein the one or more floating point operation settings comprise one or more of a rounding mode setting, an exception disable setting, a flush to zero setting, a denormal as zero setting, a precision control setting, and an exponent width control setting.

4. The processor of claim 1, further comprising a floating point control register to store the one or more default settings, wherein the second logic is to perform the floating point operation in accordance with at least one of the one or more default settings if the override control data indicates that the at least one of the one or more default settings are to be maintained for the instruction.

5. The processor of claim 1, wherein the override control data comprises one or more bits for a rounding mode setting, one bit for a flush to zero setting, one bit for a denormal as zero setting, and one or more bits for a precision control setting.

6. The processor of claim 1, wherein an operand of the instruction is to comprise the override control data.

7. The processor of claim 1, wherein the instruction is one of an FMA (Floating point-Multiply-Accumulate) instruction, an add instruction, a multiply instruction, a divide instruction, a floating point compare instruction, a floating point format conversion instruction, and a square root instruction.

8. The processor of claim 1, wherein the exception disable bit is to prevent modification of status in a floating point control register in response to any type of floating point exception.

9. The processor of claim 1, wherein at least one of the one or more bits of the override control data provides precision control by forcing rounding of a mantissa to a lower precision format.

10. The processor of claim 1, wherein at least one of the one or more bits of the override control data provides exponent width control to control a width of an exponent of a floating point number on which the floating point operation is performed.

11. The processor of claim 1, wherein the override control data is to indicate a round-to-nearest-ties-away rounding mode.

12. A processor comprising:
a decode unit to receive a vector instruction having one or more bits of override control data, wherein the override control data is to indicate one or more floating point operation settings that are to override one or more default settings; and
an execution unit to perform a floating point operation in response to the vector instruction and at least one of the one or more floating point operation settings,
wherein at least one bit of the one or more bits of the override control data provides exponent width control to control a width of an exponent of a floating point number on which the floating point operation is performed, and wherein the one or more bits of the override control data provide an exception disable bit to prevent reporting of different types of floating point exceptions even if unmasked in a floating point control register.

13. The processor of claim 12, wherein at least one bit of the one or more bits of the override control data provides precision control by forcing rounding of a mantissa to a lower precision format.

14. The processor of claim 12, wherein the exception disable bit is to prevent reporting of any floating point exceptions.

* * * * *